(12) United States Patent
     Discenza (10) Patent No.: US 11,863,523 B2
(45) Date of Patent: Jan. 2, 2024

(54) PROTECTING THE INTEGRITY AND PRIVACY OF DATA SHARED OVER A REMOTE CONNECTION FROM RISKS IN THE REMOTE ENVIRONMENT

(71) Applicant: Cognosante Holdings, LLC, Falls Church, VA (US)

(72) Inventor: Leonard M. Discenza, Arlington, VA (US)

(73) Assignee: COGNOSANTE HOLDINGS, LLC, Falls Church, VA (US)

(*) Notice: Subject to any disclaimer, the term of this patent is extended or adjusted under 35 U.S.C. 154(b) by 161 days.

(21) Appl. No.: 17/476,986

(22) Filed: Sep. 16, 2021

(65) Prior Publication Data

US 2022/0006780 A1    Jan. 6, 2022

Related U.S. Application Data

(63) Continuation of application No. 16/884,797, filed on May 27, 2020, which is a continuation of application No. 15/992,984, filed on May 30, 2018, now Pat. No. 10,812,450.

(51) Int. Cl.
     *H04L 29/06*    (2006.01)
     *H04L 9/40*     (2022.01)

(52) U.S. Cl.
     CPC ...... *H04L 63/0209* (2013.01); *H04L 63/1416* (2013.01)

(58) Field of Classification Search
     CPC .................. H04L 63/0209; H04L 63/1416
     See application file for complete search history.

(56) References Cited

U.S. PATENT DOCUMENTS

| | | | |
|---|---|---|---|
| 6,658,091 B1 | 12/2003 | Naidoo et al. | |
| 7,889,241 B2 | 2/2011 | Inoue et al. | |
| 9,286,102 B1 | 3/2016 | Harel et al. | |
| 10,219,155 B2 | 2/2019 | Anderson et al. | |
| 2002/0071033 A1* | 6/2002 | Gutta | G07C 9/37 348/E7.086 |
| 2012/0042358 A1 | 2/2012 | Kondur et al. | |

FOREIGN PATENT DOCUMENTS

WO    WO-2016054016 A1 *  4/2016  ............. G06F 11/30

* cited by examiner

*Primary Examiner* — Shawnchoy Rahman
(74) *Attorney, Agent, or Firm* — Baker Botts L.L.P.

(57) ABSTRACT

A method, computer readable medium, and computer wherein a system provides an agent device a remote connection to a server resource, obtains remote environment data from the agent device and obtains communication data exchanged between the agent device and a client device. With that data, the system provides a multidimensional monitoring unit associated with the agent device, and the monitoring unit provides access to the remote environment data from the agent device and the communication data exchanged between the agent device and the client device. The system further detects changes in the remote environment data and communication data associated with the remote agent, and issues alarms in response to detecting changes.

23 Claims, 6 Drawing Sheets

PROTECTING THE INTEGRITY AND PRIVACY OF DATA SHARED OVER A REMOTE CONNECTION FROM RISKS IN THE REMOTE ENVIRONMENT

CROSS REFERENCE TO RELATED APPLICATION

The present application is a continuation of U.S. patent application Ser. No. 16/884,797 filed on May 27, 2020, which is a continuation of U.S. patent application Ser. No. 15/992,984 filed on May 30, 2018, the disclosures of each of which are incorporated herein by reference in their entirety.

BACKGROUND

The present disclosure relates generally to computer and network security, including data security, and more specifically to data security in computer networks that facilitate and provide remote access to private and secured network resources or otherwise make secure network resources available to remote devices.

BRIEF SUMMARY

The computers, systems, and methods disclosed herein leverage the properties of remote computing devices to improve a computer, server, or network's ability to protect and monitor the integrity and privacy of data shared over a connection with a remote device from data risks in the remote environment.

According to an aspect of the present disclosure, a method, computer readable medium, and computer are provided wherein the system provides an agent device a remote connection to a server resource, obtains remote environment data from the agent device and obtains communication data exchanged between the agent device and a client device. With that data, the system provides a multidimensional monitoring unit associated with the agent device, and the monitoring unit provides access to the remote environment data from the agent device and the communication data exchanged between the agent device and the client device. The system further detects differences or changes in the remote environment data and communication data associated with the remote agent, and issues alarms in response to detecting changes.

Other features and advantages will be apparent to persons of ordinary skill in the art from the following detailed description and the accompanying drawings.

BRIEF DESCRIPTION OF THE DRAWINGS

The accompanying drawings are illustrative and exemplary illustrations of many aspects of the present disclosure. The drawings include like references indicating like elements, but are not limiting on the computers, systems, and methods within the scope of the present disclosure.

DETAILED DESCRIPTION

One skilled in the art appreciates that aspects of the present disclosure may be illustrated and described as pertaining to several patentable classes or contexts, including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or in a combined software and hardware implementation that may all generally be referred to herein as a "circuit," "module," "component," or "system." Furthermore, aspects of the present disclosure may take the form of a computer program product embodied in one or more computer readable media having computer readable program code embodied thereon.

The aspects of the present disclosure may use one or more computer readable media. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would comprise the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer readable storage medium may be any tangible medium able to contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take a variety of forms comprising, but not limited to, electro-magnetic, optical, or a suitable combination thereof. A computer readable signal medium may be a computer readable medium that is not a computer readable storage medium and that is able to communicate, propagate, or transport a program for use by or in connection with an instruction execution system, apparatus, or device. Program code embodied on a computer readable signal medium may be transmitted using an appropriate medium, comprising but not limited to wireless, wireline, optical fiber cable, RF, etc., or any suitable combination of the foregoing.

Computer program code for carrying out operations for aspects of the present disclosure may be written in a combination of one or more programming languages, comprising an object oriented programming language such as JAVA®, SCALA®, SMALLTALK®, EIFFEL®, JADE®, EMERALD®, C++, C #, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. Unless specifically indicated otherwise, the program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider) or in a cloud computing environment or offered as a service such as a Software as a Service ("SaaS").

This disclosure includes flowchart illustrations and/or block diagrams of methods, apparatuses (e.g., systems or computers), and computer program products according to embodiments of the disclosure to reference aspects of the present disclosure. Each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks, or otherwise described herein.

These computer program instructions may also be stored in a computer readable medium that, when executed, may direct a computer, other programmable data processing apparatus, or other devices to function in a particular manner, such that the instructions, when stored in the computer readable medium, produce an article of manufacture comprising instructions which, when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses, or other devices to produce a computer implemented process, such that the instructions which execute on the computer or other programmable apparatus provide processes for implementing the functions/acts specified in the flowchart and/or block diagram block or blocks.

While embodiments of the present disclosure may be described with respect to healthcare, banking, client service representatives, or other industry, one of ordinary skill in the art will appreciate that the methods, computers, and systems disclosed herein is useful in other industry, context, and applications. Specifically, the methods, computers, and systems described herein are not limited to application in the context of remote CSRs, and one of skill in the art will appreciate that broader applications fall within the scope of the present invention.

Organizations and persons involved in certain industries, such as those in healthcare and banking, are faced with legal obligations to implement specific information security policies, and the penalty for failing to do so can be harsh. The duty imposed to protect sensitive information flows down in an organization from the highest corporate representative to customer service representatives (CSRs). Thus, the obligation to protect sensitive information permeates all levels of an organization. Complicated issues arise in adhering to the security obligations at all levels.

For example, CSRs in the healthcare industry often require access Personally Identifiable Information (PII) and Protected Health Information (PHI) to provide service to clients and patients. The same is true for other industries, such as banking and finance, where access to sensitive information is inherent in the day-to-day operation of the business. Traditionally, CSRs service clients from data stations in a processing or call center environment controlled by an organization. The traditional, physical processing center environment provides maximum control over sensitive information, and organizations implement a multitude of security protocols to protect PII and PHI of patients and clients as that information available to and accessed by CSR during the ordinary course of business.

For example, a supervisor or team of supervisors may walk the floor or use cameras to monitor one or more CSRs to identify unauthorized viewing, copying, or other misappropriation of PII or PHI. In such controlled call center environments, a supervisor monitoring the CSRs can detect if a CSR is copying PII or PHI onto a piece of paper, or taking a picture with their cell phone or other image capturing device, for example. In addition to direct supervision within the call center, organizations may prohibit digital devices such as smart phones in areas where PII and PHI are accessible. Some may require CSRs to store all smart phones or other communication devices in a secured area so that they are inaccessible while the CSR is able to access PII or PHI. Similarly, organizations may prohibit writing utensils or scratch paper of any kind from areas where PII and PHI are accessible. Therefore, in the traditional processing center environment, the common practice of protecting sensitive information such as PII and PHI involves exercising control over and placing restrictions on the environment in which sensitive information can be accessed, and is enforced by an overseeing managing entity to ensure adherence to the security measures in the secure areas.

But there is a trend in phasing out traditional processing centers, and there are legitimate business incentives and forces prompting organizations to do so. Organizations may enable employees, agents, or others to access the private network or resources of the organization via a remote connection. Remote access to protected or private networks, servers, computing devices, peripheral devices, platforms, software, data, or other network resources is becoming increasingly important and necessary. For example, Virtual Private Networks (VPN), Virtual Machines (VM), Remote Desktop Technology (RDT) provide different techniques for enabling a remote device, i.e., a device that is not within the private network, to access resources within the private network. One of skill in the art appreciates that there are many other technologies to facilitate remote access to network resources.

In the context of the remote work environment, techniques for monitoring and protecting data accessed via a remote connection include monitoring the resources accessed by the remote device through its remote connection to the private network, enabling a supervisor to monitor a replication of a remote device's desktop, and/or recording the conversation between the remote agent and the client, as such tools and techniques were traditionally available in the context of the traditional processing center. However, the full range security measures typically exercised in controlled processing centers is not available in the context of a remote environment, and the remote environment introduces new risks to sensitive data accessed via the remote connection.

As a practical matter, for example, organizations cannot install stand-alone video monitoring equipment in dozens or even hundreds of CSR's homes. Moreover, doing so would defeat some of the purpose of enabling remote work by limiting the CSR to a single remote work environment that could be monitored by the organization. But even if practical options existed to enable an organization to monitor all remote CSRs through live monitoring feeds, such monitoring does not protect against many risks to the remotely accessed data. For example, a remote CSR may keep their note taking device out of view of the camera, and thus the supervisor cannot see the CSR misappropriating the sensitive information, and such a breach may go undetected. Or, unauthorized individuals may be in the room, but out of view of the camera, such that the supervisor cannot see the unauthorized individuals and detect the misappropriation of the sensitive information the CSR is accessing or discussing with a client. There is currently no effective means for a computer network to monitor the environment from which the network resources are remotely accessed, and without the traditional processing center environment, there is a hole in data security introduced by providing remote access to sensitive network resources.

Thus, there is a need for a system capable of automatic multidimensional detection and remediation of security risks to data accessed via a remote connection over a network. The systems and methods discussed herein provide such a solution and address the many issues and problems introduced by providing access to sensitive data over a remote connection. There are many inventive concepts within the scope of the present disclosure relating to leveraging the components of an agent device to enable the network to provide a multidimensional monitoring platform of the remote environment. A detailed description of several embodiments of systems and methods within the scope of the present disclosure follows.

Figure 1:
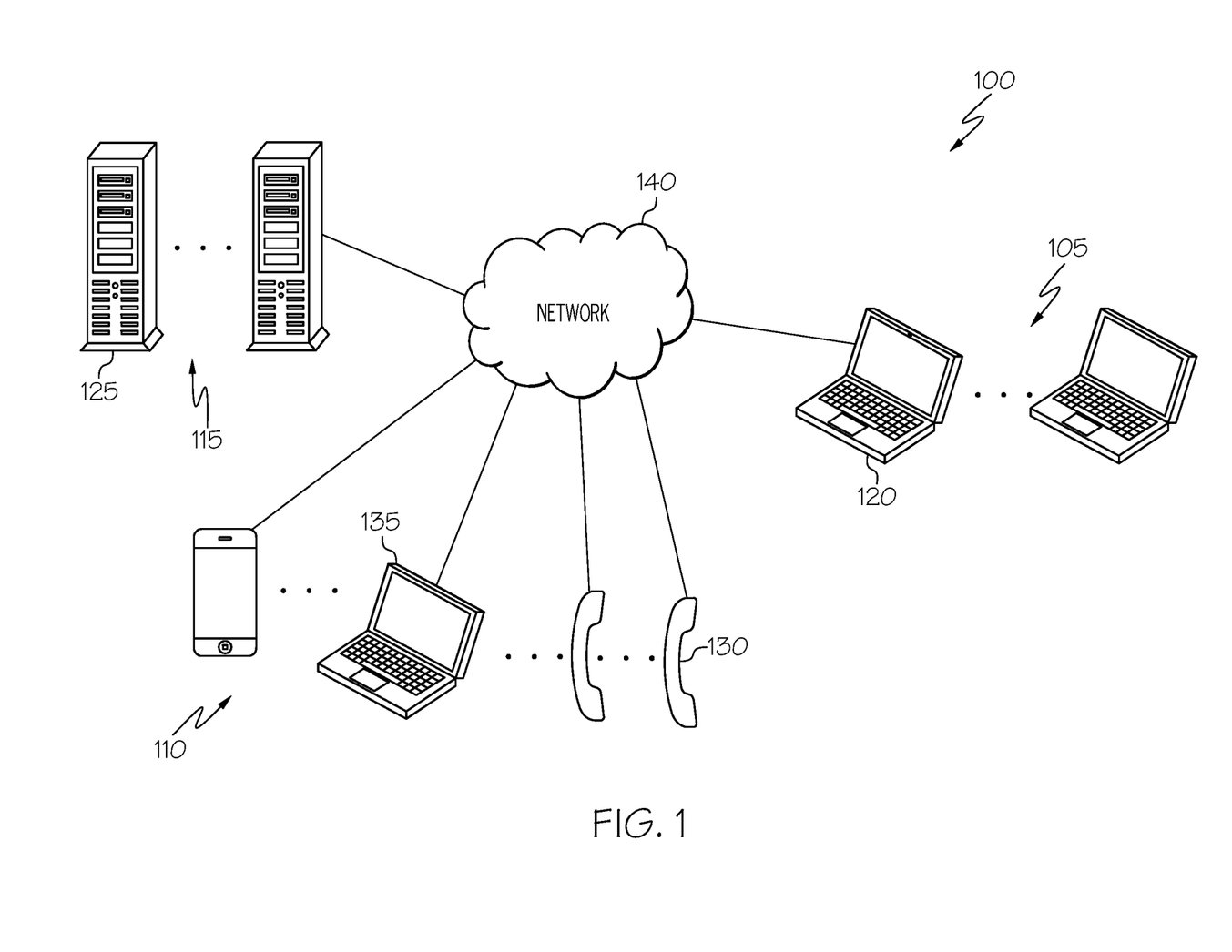
FIG. 1 illustrates a system configuration within the scope of the present disclosure comprising one or more server devices, supervisor devices, agent devices, and customer devices.

Referring to FIG. 1, Systems disclosed herein, such as System 100, may comprise networked server devices 115, client devices 110, supervisor devices, and agent devices 105. Server devices, such as server device 125, may include servers, data stores, memories, databases, software, platforms or the like. In certain embodiments, the server devices 115 may comprise and provide access to Customer Relationship Management (CRM) software, a client database, a database or memory that stores information regarding clients or other relevant persons, or other information resources and software. In such embodiments, the server device may be referred to as a server resource or comprising a server resource. There may be several server resources, such as a CRM software platform and its backend database structure. Where several server resources exist, one or more agent devices 105 may access different or the same server resource simultaneously.

Continuing with the healthcare example, the server devices 115 may comprise a database or CRM software platform used to manage client or client information, which in some embodiments comprises a server resource. Such information stored on the server devices 115 may be sensitive information such as personal health information or personally identifiable information that an enterprise has a legal obligation to protect. An enterprise that provides client support or maintains a network of agents may operate server devices, in some exemplary systems. Server devices 115 may include one or more server devices, such as server device 125, communicating or hosted on a private or enterprise network, such as network 140. It is typical in enterprise and private networks that a firewall or other similar protected point of entry exists to prevent unauthorized access to the components of the private network, and ultimately the data thereon. Thus, in certain examples, only authorized users or devices are able to access one or more server devices 115. To facilitate access to private or protected server devices 115, the server devices 115 may comprise one or more Dynamic Host Configuration Protocol (DHCP) servers or Virtual Private Network (VPN) servers or a server to provide remotely displayed Virtual Machines (VM) on remote devices. In such embodiments, a remote access manager or an access management server, which may be comprised of one or more server or supervisor devices, manages remote access and connections to server resources.

Supervisor devices may comprise one or more personal computing devices such as laptop computers, desktop computers, smart phones, servers, or server devices 115. In some embodiments, trusted supervisors use supervisor devices to access one or more server devices, for example, when such server devices are within a private, secured network. In some configurations, supervisor devices may be devices provisioned by the same entity that operates the server devices. In such an embodiment, the supervisor device may be a device with pre-established trust to one or more of the server devices 115, and agent devices 105 may be equipped with software and/or firmware that facilitates a secure and private connection with one or more of the server devices. Supervisor devices may be in a client-server relationship with one or more server devices. In other embodiments, the supervisor devices may access the server devices 115 via a connection through the World Wide Web or the Internet using a web browser. Within the scope of the present disclosure, the systems described herein may involve a plurality of supervisor devices.

Agent devices, such as agent device 120, may comprise personal computing devices such as laptop computers, desktop computers, smart phones, or other peripheral devices such as webcams or microphones associated with the remote agent. In some embodiments, agent devices 105 are used by trusted agents to access one or more server devices 115, for example, when such server devices 115 are within a private, secured network. In some configurations, agent devices 105 may be devices provisioned by the same entity that operates the server devices 115. In such an embodiment, the agent device may be a device with pre-established trust to one or more of the server devices, and agent devices may be equipped with software and/or firmware that facilitates a secure and private connection with one or more of the server devices. Agent devices may be in a client-server relationship with one or more server devices. In other embodiments, the agent devices may access the server devices via a connection through network 140, for example the World Wide Web or the Internet, using a web browser. Within the scope of the present disclosure, the systems described herein may involve a plurality of agent devices 105.

Client devices 110 may include personal computing devices such as laptops, e.g., client device 135, or smart phones associated with a client or client, or other third-party. In some embodiments, client devices may include telephones networked via a telephone network such as the Public Switched Telephone Network (PSTN), as represented by client device 130. One of skill in the art will appreciate that client devices 110 within the scope of the present disclosure comprises other similar devices that facilitate communication with a third-party client or protected party.

In certain embodiments of the systems within the scope of the present disclosure, server devices 115, supervisor devices, agent devices, 105 and client devices 110 may communicate via a network 140 such as the Internet. The connection between the server devices, supervisor devices, agent devices, and client devices may be in a star or mesh type configuration. In a star-type network configuration, the server devices may act as a central network point, such that connections and communications between the agent devices, supervisor devices, and the client devices must pass through one or more server devices, rather than the agent devices, supervisor devices, and client devices communicating directly with one another over the network. In other embodiments however, agent devices and supervisor devices may communicate directly with one another or client devices, thereby providing a mesh-type, point-to-point, or peer-to-peer connection between the networked devices.

The systems and methods described herein may involve one or more server devices or supervisor devices establishing a connection with the first agent device. Such connections may comprise, in certain embodiments, the server device or supervisor device providing a remotely-displayed virtual machine at the agent device. In such embodiments, the agent device may access data stored on one or more server devices via the virtual machine. Providing a remotely-displayed virtual machine at the agent device facilitates the monitor and identification of the data accessed through the virtual machine by a server device facilitating the transfer of data between the remotely-displayed virtual machine. In other embodiments, the connection with the agent device may occur via a portal accessible through a web browser. Exchange of sensitive information may occur via the connection between the server device and the agent device. Thus, the connection is preferably secure.

In certain embodiments, the server device or supervisor device may provide the agent device with remote access to the server device or supervisor device, or resources stored or available thereon. Providing remote access may refer to establishing a connection with the agent device, or may include copying or otherwise reproducing or presenting information from the server device or supervisor device to the remote device, or other similar means of providing the agent device access the enterprise resources and sensitive information via the connection from a remote location, i.e., a remote environment. As mentioned above, remote access may be established through a direct connection between the server device and the agent device, or remote access may be established through an intermediary such as, for example, a supervisor device or another server device, or some other trusted intermediary.

In certain configurations, the supervisor device may establish a connection with the agent device, wherein the supervisor device has a connection with one or more server devices and enables the agent device to access the server devices through the supervisor device acting as an intermediary. By establishing the connection with the agent device, the server device or supervisor device is able to control, monitor, and record the resources on the server devices accessible to the agent device. As will be discussed further, in certain embodiments, the systems and methods herein may comprise monitoring the connection with the agent device contemporaneous with a potential security risk to identify the potentially compromised data.

The systems and methods described herein may also provide for obtaining remote environment data from one or more agent devices. In certain embodiments, one or more server or supervisor devices may obtain the remote environment data. Remote environment data may comprise data obtained from the agent device or peripheral devices coupled to the agent device. For example, referring to FIG. 2, remote environment data 220 may be data collected or obtained through a camera, such as agent camera data 230, microphone, such as agent mic data 225, screen or other display, or peripheral device controller, such as agent PIC data 235, within or coupled to the agent device. As discussed above, in certain embodiments, the agent device may be a microcomputing device such as a laptop or desktop personal computer. In such embodiments, the camera and microphone devices associated with the agent device may be built-in devices within the agent device, such as a built-in microphone and camera in a laptop computer. Thus, through the agent device, the systems and methods herein may collect and monitor data that represents the visual and auditory environment associated with the agent device, thereby providing a multidimensional stream of data representing the remote environment. In some embodiments, the remote environment data may comprise one of video, image, or audio data. The remote environment data may be transmitted in instances, snapshots, segments, or continuously, all of which will be referred to herein as a stream of data.

Figure 2:
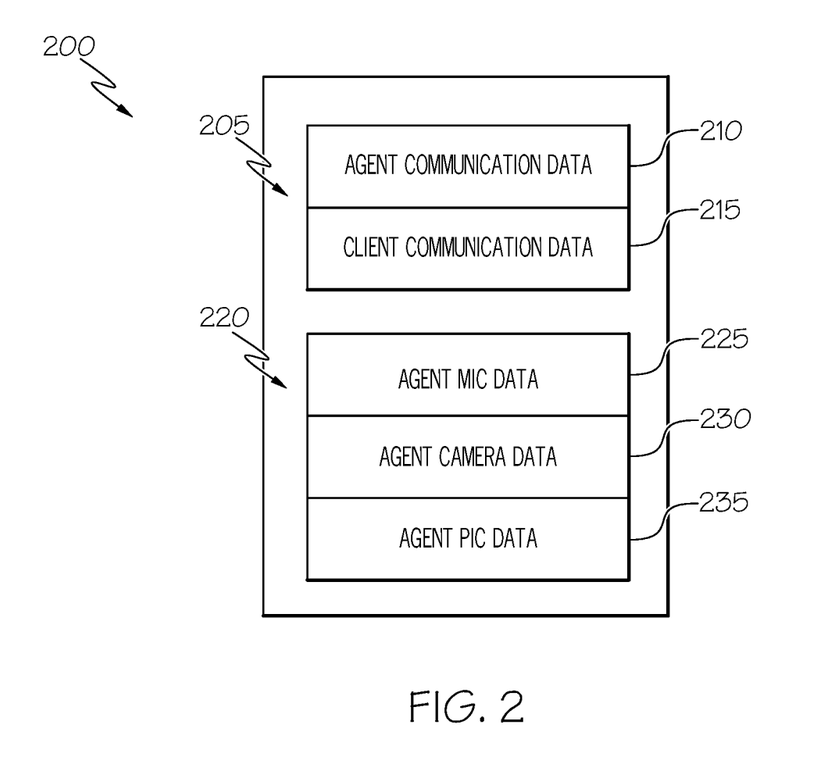
FIG. 2 illustrates a block diagram of an exemplary multidimensional monitoring object.
Figure 3:
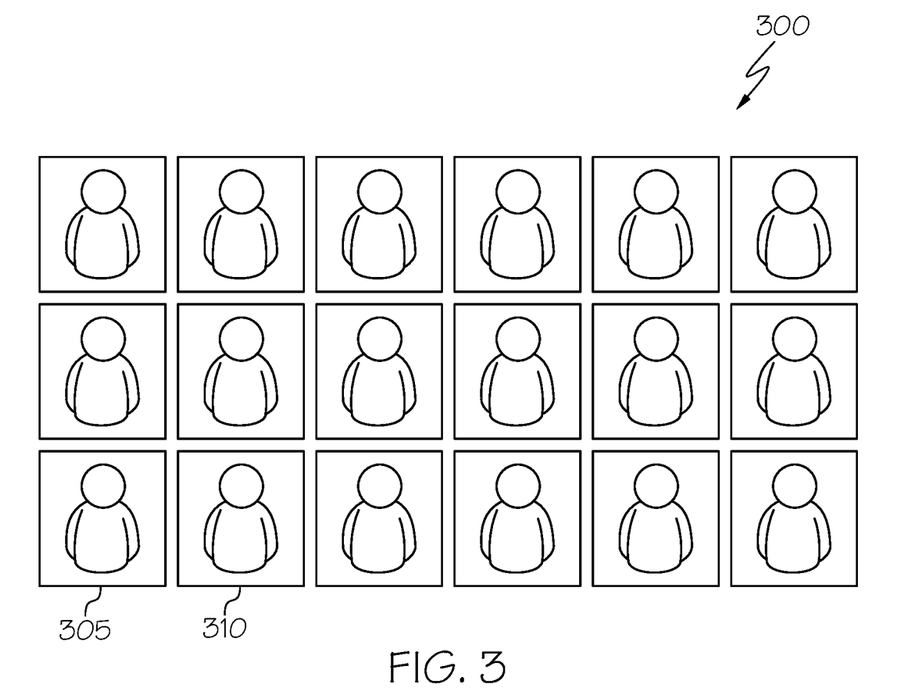
FIG. 3 illustrates a representation of a monitoring environment.

In addition, the remote environment data 220 may comprise data obtained from a peripheral interface controller (PIC), such as agent PIC data 235, to monitor input/output (I/O) from the agent device, thereby providing another dimension of remote environment data 220. In such an embodiment, the remote environment data 220 comprises the data the agent device exchanges via I/O with other peripheral devices such as external displays, networking devices, storage devices and other memories, for example. Other peripheral I/O devices may include a keyboard and mouse, from which the remote agent's keystrokes or navigation inputs may comprise remote environment data. In certain configurations, remote desktop software may be utilized to capture the activity on the desktop of the agent device.

As an example of a multidimensional stream of data representing the remote environment, consider the agent device is a personal computing device and the remote environment data comprises data obtained via the microphone and/or camera within the agent device, i.e., data obtained via the laptop's built-in camera and/or microphone. With a multidimensional stream of data representing the remote environment, enterprises can provide novel monitoring of the agent device and remote environment to address the problems introduced by enabling access to sensitive data via a remote connection.

By way of example, consider a CSR who appears to not pose a risk of misappropriation to the sensitive information, i.e., the CSR is not using their smart phone or appear to be writing down sensitive information. The CSR is easily able to escape detection of misappropriation by placing a pad of paper or audio recording device, for example, out of view of the camera. Traditional systems offer no solution. However, an exemplary embodiment of the present disclosure provides a solution by leveraging the I/O devices at the remote device to provide a multifaceted and multidimensional data stream representing the remote environment associated with the agent device. In other words, in addition to data associated with the camera in the agent device, such as a video stream of the CSR, the multidimensional stream of remote environment data may comprise data associated with the agent device built-in microphone, for example. Thus, if a CSR is copying sensitive information out of view of the camera, the internal microphone in the agent device may detect the sound of a pen or pencil dragging across paper. Or, in the situation where an unauthorized third-party is in the vicinity, the internal microphone may capture the sound of that person talking in the background or making other noises.

In addition to obtaining remote environment data from the agent device, which as described above may comprise a multidimensional stream of remote environment data in certain embodiments, the systems and methods herein may obtain the communication data exchanged between the agent device and a client device, such as communication data 205. In some embodiments, a server device or supervisor device may obtain the data exchanged between the agent device and the client device. The data exchanged between the agent device and the client device could comprise data associated with a telephone call, Voice Over IP (VoiP) session, video-conferencing session, or other communication session. In particular embodiments, the data exchanged between agent device and the client device will comprise a multidimensional stream of data comprising both agent data 210 and client data 215. For example, the exchanged data may include both agent audio data and client audio data, and/or agent video data and client video data. In other embodiments, the data exchanged between the agent and the client devices could be data such as emails, chat messages, or other text messages. In accordance with this disclosure, the data exchanged between the agent and the client may include communication data. By obtaining a multidimensional stream of the exchanged data, the systems described herein may be able to perform separate sentiment or other audio analysis on the individualized agent or client data streams to detect changes in sentiment of the agent and/or client separately.

To facilitate the automatic detection and remediation of risks to sensitive data, systems and methods herein may provide one or more monitoring environments. The systems and methods disclosed herein may provide a monitoring environment on one or more server devices. Monitoring environments may comprise a platform for presenting and processing a plurality of multidimensional monitoring objects. The monitoring environment may comprise a graphical user interface providing access to the plurality of multidimensional monitoring objects, as seen in FIGS. 3-6.

The systems and methods described herein may create or establish a plurality of multidimensional monitoring objects. The multidimensional monitoring object relates closely to the inventive concepts of the present disclosure as one of the underlying technologies enabling a network to adequately monitor the integrity of remotely accessed data by monitoring the remote environment. Referring to FIG. 2, the combination of remote environment data 220 and the data exchanged between an agent and a client 205 in a multidimensional monitoring object 200 leverages the technical properties and configuration of a remote device to improve a computer, network, or server's ability to protect and monitor data transmitted via a remote connection by providing new functionality to the computer, server, or network enabling it to protect against threats to the integrity and privacy of sensitive data in the physical remote environment.

A multidimensional monitoring object, such as monitoring object 200, may be a data structure, function, method, variable, or the like comprising the remote environment data from the agent device, such as remote environment data 220, and the data exchanged between the agent device and the client device, such as communication data 205. The multidimensional monitoring object may be created or provided by aggregating the remote environment data into a package with the data exchanged between the client and the agent, thereby providing access to both data sets through one object. In other embodiments, a multidimensional monitoring object may be created by porting the multidimensional streams of remote environment data and data exchanged between the agent and client to a graphical user interface, such as the monitoring environment, wherein a user of the interface can selectively access one or more of the data streams. Thus, components of the multidimensional monitoring object, such as video or pictures from the camera at or within the agent device may be previewed in a monitoring environment, such as that depicted in FIGS. 3-6.

In certain embodiments, the systems and methods described herein may create a multidimensional monitoring object by defining a monitoring object class, where such class can be a combination of variable, functions, and other data structures. For example, the systems and methods may define a monitoring object class, which comprises a remote environment data structure and an agent-client communication data structure. Each of these data structures within the monitoring object class may themselves comprise variable, functions, or other data structures, as one of skill in the art would appreciate. In such examples, the monitoring object would need to be initialized, and a new instance of monitoring object may be initialized and created for each agent device. Initializing an instance of monitoring object may occur by initializing the values of the remote environment data and the data exchanged between the agent device and the client device with the remote environment data obtained from the agent device and the obtained data representing the communications between the client and the agent.

The systems and methods may process the data comprising the multidimensional monitoring object via functions, global or private, accessible to the instances of the monitoring object. For example, the monitoring object may have access to a global function that performs sentiment analysis, therefore, each monitoring object could invoke a sentiment analysis function, or a thread or instantiation of that function to run sentiment analysis on agent or client communication data obtained by the system. Similarly, the processes for determining changes in image data obtained via a camera at the agent device, for example, may be implemented in a function accessible to the monitoring objects so that each monitoring object may invoke the change function or a thread of the function to determine changes to the image data associated with each agent device.

One of skill in the art would appreciate the discussion above describing the multidimensional monitoring object as a data structure or data object is illustrative and exemplary, and one of skill in the art would recognize that a monitoring object can be created and provided through other common computer programming techniques. For example, the multidimensional monitoring object may comprise several objects, data structures, functions, methods, or it may comprise multiple layers or levels of data objects, structures, functions, or methods. In certain embodiments, the multidimensional monitoring object comprises the remote environment data from the agent device and the data exchanged between the agent and the client, or a pointer or reference to that data.

The multidimensional monitoring object may provide access to the remote environment data and/or the data exchanged between the agent device and the client device.

For example, a supervisor or other individual with access to the monitoring environment may access the multidimensional remote environment data and multidimensional data exchanged between the remote agent and the client devices by hovering over, clicking on, or otherwise selecting a monitoring object associated with an agent device. Thus, in such embodiments, the monitoring object may be represented by a window in a graphical user interface corresponding to an agent or agent device, such as monitoring objects 305 and 310 illustrated in FIG. 3. In other similar embodiments, the monitoring objects could be presented in list or tabular format. In certain embodiments, several multidimensional monitoring objects may be accessible via the monitoring environment, for example, monitoring environment 300, such that the monitoring environment provides access to a plurality of remote environment data associated with a plurality of agent devices, along with the corresponding data exchanged between each of the plurality of agent devices and respective corresponding devices. Thus, particular embodiments may provide for a multithreaded monitoring environment comprising a plurality of threads, each thread corresponding to an agent device.

The monitoring environments described herein may perform different levels of processing of remote environment data and data exchanged between remote agents and client devices to automatically detect and remediate risk to sensitive data. For example, the server devices and monitoring environment detect changes to the multidimensional monitoring objects by processing the remote environment data to detect significant changes or anomalies in the remote environment data. Such changes may correspond to changes with respect to, for example, changes in remote image data associated with the camera, remote audio data associated with the microphone, or changes to the state of the agent device associated with the peripheral interface controller. In some embodiments, the server devices and the remote monitoring environment may monitor all three dimensions of the remote environment data discussed in this example simultaneously. In other embodiments, the server devices and monitoring environment may monitor only one dimension of the remote environment data, for example, remote environment data obtained through the camera at the agent device. As mentioned above, the processes described herein may be implemented in one or more functions capable of processing one or more monitoring objects and one or more threads or streams of data corresponding to a monitoring object.

The monitoring environment and server devices may detect changes in remote environment data in several ways within the scope of the present disclosure. As one of skill in the art would appreciate, there any many known techniques for detecting changes to images, audio, and other data such as the peripheral device status of the agent device. An exemplary technique for doing so involves establishing a norm or acceptable state for each dimension of the remote environment data and uses that as a baseline for detecting changes. In such systems, detecting changes or anomalies may involve calculating a delta value, which represents the difference between a current instance or set of instances from a predetermined or prior instance or set of instances, which are used as a baseline.

For example, detecting a change in an image captured by the camera may be accomplished by processing images captured by the camera at the agent device and performing pixel analysis on a frame or set of frames. To provide an example, suppose the stream of remote environment data comprising images and/or video from the agent device begins and the monitoring environment obtains that data. For this example, the system processes fifteen frames of image data to determine whether meaningful change in pixel arrangement occurred. After processing fifteen frames of image data, the system may start detecting changes in the image, i.e., changes in the pixel arrangement, by comparing the pixel sets of each set of fifteen frames to the fifteen frames before it. In some embodiments, the images being compared may not be consecutive. For example, the system may capture a first image at one point in time and capture a second image at a subsequent point in time and compare the second image to the first image, wherein the first and second images are not consecutive images captured by the camera. In addition, in certain embodiments, more than one image may be compared to prior images and the images being compared may not be consecutive sets of images captured by the agent camera. The system may also compare each set of frames to a predetermined set of frames as a check on gradually changing environment conditions against an accepted or approved baseline, for example, the first fifteen frames, or some other baseline model. Because it is highly unlikely the remote environment would not change whatsoever during the course of a monitoring session, a threshold change value can be set to differentiate a meaningful change from an inconsequential change. In such embodiments, the system determines a change value representing the difference in pixel arrangement, using a bitmap or raster technique, for example, and compares the change value to the threshold change value. It might be determined that a five or ten percent change in image arrangement is acceptable, and thus if the change value is less than that threshold, the system will not detect a change to the image data captured by the camera at the agent device. Other threshold techniques exist, such as thresholds for detecting change based on the number of different pixels, or thresholds that detect when groups of pixels of certain size or pattern change, for example.

Regarding detecting a change in audio captured by the microphone associated with the agent device, a similar baseline or delta technique can be used. However, rather than image samples, the system establishes a baseline and detects changes in the composition of audio samples. For example, the system may detect a change to the audio data from the microphone at the agent device if the remote agent begins to write down sensitive information by detecting the noise generated by the pen or pencil dragging across a piece of paper, because comparing the audio data with the pencil scratching may amount to a change in the audio data from before the writing started. Detecting a change to the agent device via the peripheral interface controller may be even simpler because it is likely a very low tolerance, if any tolerance, for changes in the state of peripheral devices at the agent device. The system may detect a change anytime a removable storage device, display, voice recorder, keystroke logger, printer, or other peripheral device connects or plugs-in to the agent device via one of its peripheral device interfaces or ports. A peripheral interface controller, or similar module, may be responsible for managing connections to peripheral devices.

In some embodiments, a supervisor device participates in establishing the baseline for the remote environment data including the image data, the audio data, and the status of peripherals. To further explain, upon establishing a connection with the agent device, the monitoring environment and server devices may begin obtaining remote environment data from the agent device, and may make that data available via a monitoring object in the monitoring environment. A supervising entity may access the remote environment data through the monitoring object. The supervising entity may require certain authentication and may require the remote agent to manipulate the agent device, such as by turning the agent device so the monitoring agent can see the entire room to detect alarming conditions, or by speaking in a neutral tone for a specified period to establish a voice baseline, before approving a remote agent device to provide services to clients or access network resources. The system may utilize such approved remote environmental conditions as the initial or model baseline used to detect changes for a session.

In addition to processing the remote environment data to detect a change to the multidimensional monitoring object, the server devices and monitoring environment may also process the data exchanged between the agent device and client device to detect significant changes or anomalies in the speech of the agent or client. Known techniques of sentiment and speech analysis may be applied to the communication data of both the client and the remote agent to determine the attitude or emotion of the respective speaker. Known techniques for sentiment analysis may include knowledge-based techniques, statistical methods, or hybrid approaches combining the two.

The systems and methods disclosed herein also contemplate a level of machine learning such that the system may establish and tune models for detecting changes to remote environment data. For example, the system may signal a change to the remote environment data when a remote agent sneezes and covers his or her nose and mouth, which may be accompanied by drastic and substantial bodily movement for some individuals. However, the system may receive input instructing the system to not alarm when such movement is detected, save and model the movement, and use the model to in detecting changes to image data in the future. Continuing with the same example, the loud and disrupting noise accompanying a sneeze could trigger the system to signal a change to remote audio data from the remote microphone. The system may receive instructions that the sound of sneezing is not a risk, save and model the sound composition, and use that model in detecting changes to the audio data from the agent device microphone. With respect to detecting changes in the sentiment of the remote agent or the client, some remote agents may have harsh and loud voices, or high-pitched voices, which may trigger an angry or agitated tone in a traditional sentiment analysis. To teach the system and move the baseline, the system may receive an instruction that such sentiment is normal, and the system may adjust its sentiment analysis to account for the adjusted range of normality.

Figure 4:
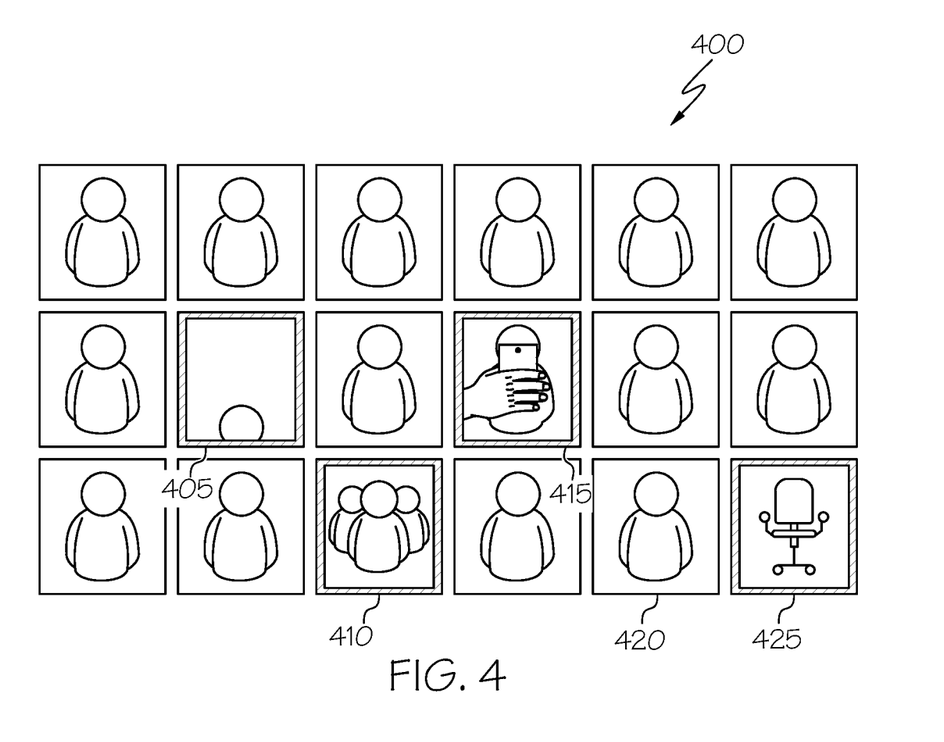
FIG. 4 illustrates a representation of the monitoring environment of FIG. 3 wherein the system raised environmental alarms regarding several respective monitoring objects.
Figure 5:
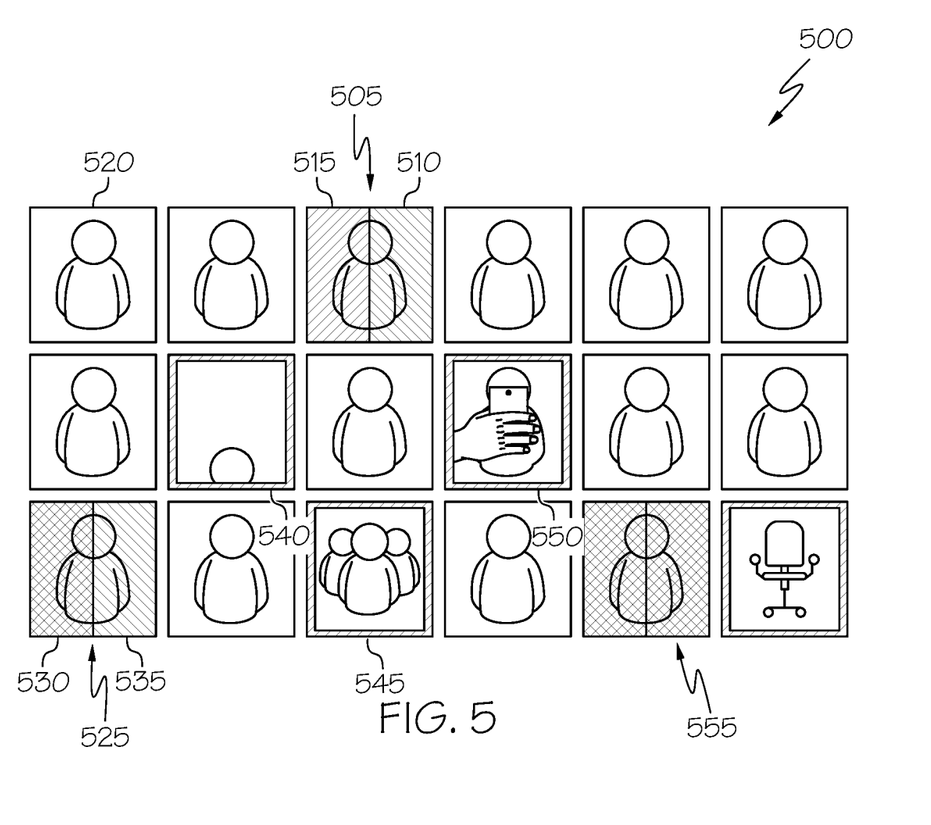
FIG. 5 illustrates a representation of the monitoring environment of FIG. 4 wherein the system raised environmental and speech alarms regarding several respective monitoring objects.
Figure 6:
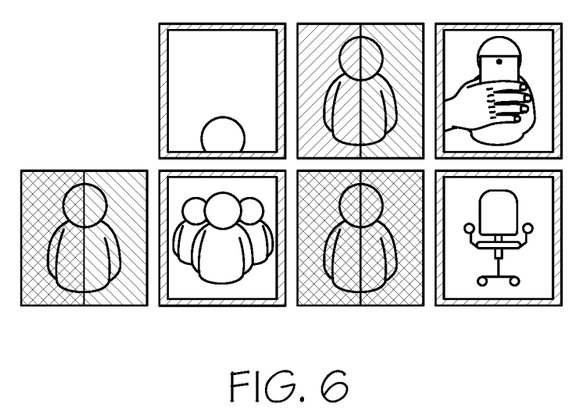
FIG. 6 illustrates a representation of the monitoring environment of FIG. 5 wherein the system displays monitoring objects of interest in the monitoring environment.

In response to detecting a change to the multidimensional monitoring object, the systems and methods within the scope of the present disclosure may issue a risk alarm. If the agent device is accessing sensitive data via the connection with the server device, the risk alarm may represent a potential risk to that sensitive information. By detecting potential risks to sensitive data on at least two dimensions via the multidimensional monitoring object, the systems and methods disclosed herein are able to signal two types of alarms: environment alarms and speech alarms. Environment alarms correspond to potential risks presented by changes to the remote agent environment. Referring to FIG. 4, exemplary environment alarms are illustrated by emphasizing and shading pertaining to monitoring objects 405, 410, and 415. Speech alarms correspond to issues related to mood or emotion of either the remote agent or the client. Referring to FIG. 5, exemplary speech alarms are illustrated by overlaying or shading aspects of monitoring objects, as seen regarding monitoring objects 505, 525, and 555. In some embodiments, the systems signals environment alarms and speech alarms differently, as can be seen in FIG. 5, for example, comparing the speech alarms (515 and 510) pertaining to monitoring object 505 and the environment alarms pertaining to monitoring objects 550 and 545. As a further example, consider an example of a multidimensional monitoring object presenting a live stream of video data captured by the camera at the agent device. Upon detecting a change in the remote environment data captured by the camera at the agent device, the system may cause a graphics controller to emphasize a portion of a graphical user interface (GUI) associated with the monitoring object by drawing a box around that respective portion of the GUI, such as that illustrated with respect to monitoring objects 540, 545, for example. The visual alarm may be accompanied by an audible alarm as well. Similarly, upon detecting a change in the sentiment of the conversation between the remote agent and the client, the system may cause a graphics controller to emphasize the portion of the graphical user interface (GUI) associated with the monitoring object by overlaying or tinting a portion of the GUI corresponding to either the sentiment of the agent or the client, as shown for example regarding monitoring objects 505, 555, and 525.

As FIG. 5 illustrates, certain embodiments of the systems and methods disclosed herein may differentiate between the sentiment of the agent and client, and thus perform a dual or multifaceted sentiment analysis. For example, referring to FIG. 5, monitoring object 505 shows light shading or tinting regarding the sentiment of the agent 515 and the client 510. In some embodiments, this could be a color overlay, such as green, to depict that sentiment of both agent 515 and client 510 are normal. Monitoring object 525, however, provides an example of differentiated sentiment analysis and alarm, and shows that the sentiment of the agent 530 is darker than the sentiment of the client 535, thereby indicating that the agent may be angry or upset, while the client is calm and normal. In other examples, such as that shown regarding monitoring object 555, both sides of the sentiment analysis may be dark and emphasized, thereby indicating that both the client and the agent are angry, such as if they are in a disagreement or argument.

In certain embodiments, a multidimensional monitoring object, window, or unit may be created or available for each agent device, however, every monitoring object or unit may not be visible is displayed in the monitoring environment graphical user interface. Such a configuration is ideal in a situation where there are dozens of active agent devices and the monitoring environment would be overcrowded if every monitoring object was displayed. Therefore, in some embodiments, such as that illustrated in FIG. 6, the graphical user interface of the monitoring environment only displays objects of interest, such as the monitoring objects experiencing an alarm or change. In such embodiments, the processing and detecting or changes to the monitoring object may occur in the "background," and the monitoring object may only be displayed when the system detects a change or receives an instruction to display all or a specific monitoring object. In certain embodiments, then, the system responds to detecting a change in the monitoring object by formatting the monitoring object or unit (and the data comprising it) for display or presentation in the graphical user interface on a supervisor device or one or more server devices. In such an embodiment, monitoring objects may appear and disappear from a monitoring environment on a supervisor's console as the system detects and resolves changes or issues.

For example, upon detecting a change in the remote environment data or the exchanged communication data, the system may cause a monitoring object associated with that agent to be appear on a supervisor's console within the monitoring environment. The monitoring environment may comprise one or more monitoring objects experiencing or having recently experienced change, or for which an alarm was raised in response to detecting a change. Given the potential for overcrowding of monitoring objects displayed in the monitoring environment, the system may present a thumbnail of the data captured by the agent camera associated with each respective monitoring object of interest, at least until a selection or instruction to present other remote environment data or the communication data exchanged between a client and agent is received by the system. In such a system, the system may receive a user input selecting a particular monitoring object by using the graphical user interface. Upon selecting a particular monitoring object, the system may present all or some of the remote environment data or communication data associated with that monitoring object. For example, upon selecting a monitoring object, the system may present the communication data between the agent and client through a speaker or other audio device at the supervisor or server device, allowing a supervisor to "listen in."

After a predetermined amount of time, or upon receive an instruction, the system may remove or hide a monitoring object from the graphical user interface. For example, the monitoring object may experience a change in remote environment data, causing the system to display it in the supervisor's monitoring environment. The supervisor may access the remote environment data or the data exchanged between the client and the agent, or he may not. In any event, if a remedial instruction is not received within a certain time after a change is no longer detected or the alarm expires, the thumbnail associated with the monitoring object may disappear from the monitoring environment because it is no longer experiencing change, and therefore is not a risk that warrants attention.

In particular embodiments, the system may store the remote environment data and the data exchanged between agent device and the client device in response to issuing a risk alarm and may respond to the risk alarm according to a received instruction. Storing the remote environment data and the data exchanged between the agent device and the client device in response to the risk alarm enables the system to determine the precise data at risk of compromised integrity or misappropriation. In other embodiments, the system may replicate the desktop of an agent device upon detecting a change to the remote environment data. In such embodiments, the system may use this data to determine what sensitive data was accessed when the change occurred and/or the alarm issued. Cross referencing this data is one way to identify potentially misappropriated data.

In certain embodiments, the systems and methods disclosed herein may obtain and monitor data associated with the first agent device and Customer Relationship Management (CRM) software, or other enterprise resources accessed via the remote connection. In such embodiments, enterprises may be able to cross reference the data the CSR accesses via the remote connection with the CRM software with contemporaneous detection of a potential data breach or security risk to identify the potentially compromised sensitive data. For example, if the systems and methods herein detect a change in the remote environment data, for example if a CSR raises their cell phone, and the system signals a security risk event, the system may also gather remote environment data representing the data that was viewable on the agent device's screen and corroborate that with the CRM software to identify which data is at risk of misappropriation. In such embodiments, the systems detect the potentially misappropriated data by cross referencing the data regarding the issued risk alert with the data that the CSR was accessing contemporaneous with the change in remote environment data that caused the alert to issue.

The systems and methods within the scope of the present disclosure may use several different curative or remedial means for responding to a risk. In response to the alarm, the system may receive an instruction to establish a connection with the first client device, wherein the connection is between the server device or supervisor device and the client device. In certain embodiments, this may enable a supervisor at the supervisor device or server device to communicate with the client and client device. Another response to an alarm may include disabling the agent device, for example, by terminating a connection between the agent device and client device. Continuing with the example above, if sentiment analysis detects that both the client and the agent are speaking loudly and rapidly, the sentiment analysis software may determine that the agent and/or client are angry or arguing, and issue a risk alarm overlaying a red coloring over the monitoring object to signal the intensity of the conversation. In such a situation, the system may receive instructions to disable the remote agent device and/or establish a connection with the server or supervisor device so that the supervisor can intervene in the conversation to assuage the tension.

Another response may include identifying the change in the remote environment data or the change in the data exchanged between the remote agent and the client device as an acceptable change or acceptable event. Continuing with the example of a sneeze discussed above, the system may receive an instruction that the risk alarm issued in response to detecting a user's violent bodily movement during a sneeze and/or the associated change in audio from the burst of sound, and that the behavior is acceptable and is not a risk. The instructions may be received as inputs from a supervisor selecting one or more options from a drop-down menu, for example.

A further benefit of the systems and methods disclosed herein is that the server device or supervisor device may establish connections with several agent devices, and likewise create several multidimensional monitoring objects. Therefore, in particular embodiments, a monitoring environment, such as monitoring environments 300, 400, or 550, or that illustrated in FIG. 6, may be established on one or more server devices or supervisor devices comprising a matrix of multidimensional monitoring objects. This technology improves a server or computer's ability to protect and monitor the integrity of data exchanged over a remote connection by identifying and remediating potential and actual risks to the data introduced by factors in the remote environment which, prior to the systems and methods disclosed herein, were not adequately protected against. By providing a monitoring environment comprising a plurality of multidimensional monitoring objects, each associated with a different agent device, the computer and network are also improved by increasing scalability of the network as the number of agent devices increases and clients increase, and thereby provides scalability to the computer system that was previously unachievable. Therefore, certain embodiments of the systems and methods disclosed herein may comprise providing a second agent device remote access to a second server device, and creating a second multidimensional monitoring object associated with the second agent device.

The flowcharts and diagrams in FIGS. 1-6 illustrate the architecture, functionality, and operation of possible implementations of systems, methods, and computer program products according to various aspects of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to comprise any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. For example, this disclosure comprises possible combinations of the various elements and features disclosed herein, and the particular elements and features presented in the claims and disclosed above may be combined with each other in other ways within the scope of the application, such that the application should be recognized as also directed to other embodiments comprising other possible combinations. The aspects of the disclosure herein were chosen and described in order to best explain the principles of the disclosure and the practical application and to enable others of ordinary skill in the art to understand the disclosure with various modifications as are suited to the particular use contemplated.

What is claimed is:

1. A method, comprising:
monitoring a remote environment associated with an agent device;
identifying an image in the remote environment;
comparing the image in the remote environment to a stored image associated with the agent device;
detecting, based upon the comparison of the image in the remote environment to the stored image, an unauthorized change in the remote environment; and
in response to detecting the unauthorized change in the remote environment, issuing a notification;
wherein detecting an unauthorized change in the remote environment comprises detecting an unauthorized mobile phone in the remote environment.

2. The method of claim 1, wherein:
the image in the remote environment comprises an image of a customer service representative in the remote environment;
comparing the image in the remote environment to a stored image associated with the agent device comprises comparing the image of the customer service representative to the stored image; and
detecting the unauthorized change in the remote environment further comprises detecting an unauthorized third party in the remote environment.

3. The method of claim 1, wherein detecting the unauthorized change in the remote environment comprises detecting, based upon the comparison of the image in the remote environment to the stored image, that a change in the remote environment exceeds a predetermined threshold.

4. A method, comprising:
monitoring a remote environment associated with an agent device;
identifying an image in the remote environment;
detecting, based upon the image, an unauthorized change in the remote environment, wherein detecting an unauthorized change in the remote environment comprises detecting an unauthorized mobile device comprising a cell phone in the remote environment; and
in response to detecting the unauthorized change in the remote environment, issuing a notification.

5. The method of claim 4, wherein the agent device comprises an agent camera and an agent microphone, and wherein monitoring the remote environment comprises monitoring the agent camera and the agent microphone.

6. The method of claim 1, wherein the agent device comprises an agent microphone and wherein detecting an unauthorized change in the remote environment further comprises detecting a change in audio captured by the agent microphone.

7. The method of claim 1, wherein detecting an unauthorized change in the remote environment comprises:
determining a change value between the detected image in the remote environment and the stored image; and
determining whether the change value exceeds a threshold change value.

8. The method of claim 4, further comprising responding to the notification, wherein responding to the notification comprises at least one of:
establishing a communication connection between a supervisor device and the agent device; and
disabling the agent device.

9. The method of claim 4, further comprising:
in response to issuing the notification, identifying potentially misappropriated data, wherein identifying potentially misappropriated data comprises identifying data accessed by the agent device via a remote access at a time that the image in the remote environment was identified as potentially misappropriated data.

10. The method of claim 4, wherein the remote agent device comprises a desktop and further comprising replicating the desktop upon detecting the unauthorized change in the remote environment.

11. The method of claim 4, wherein responding to the notification comprises establishing a communication connection between a supervisor device and the agent device, and further comprising:
receiving input indicating that the unauthorized change in the remote environment is not a risk; and
adjusting a model for detecting environmental changes, using machine learning.

12. The method of claim 11, wherein the adjusted model saves the unauthorized change in the remote environment and uses the model for detecting the environmental changes in the future.

13. The method of claim 4, wherein responding to the notification comprises establishing a communication connection between a supervisor device and the agent device, and further comprising receiving input indicating not to alarm when the unauthorized change in the remote environment is detected in the future.

14. The method of claim 13, further comprising:
adjusting a model for detecting environmental changes, using machine learning, based upon the received input; and
wherein the adjusted model saves the unauthorized change in the remote environment and uses the model for detecting the environmental changes in the future.

15. A non-transitory computer readable storage medium storing instructions that are executable to cause a system to perform operations comprising:
monitoring a remote environment associated with an agent device;
identifying an image in the remote environment;
comparing the image in the remote environment to a stored image associated with the agent device;
detecting, based upon the comparison of the image in the remote environment to the stored image, an unauthorized change in the remote environment, wherein detecting an unauthorized change in the remote environment comprises detecting an unauthorized cell phone in the remote environment; and
in response to detecting the unauthorized change in the remote environment, issuing a notification.

16. The non-transitory computer readable storage medium storing instructions of claim 15, wherein:
the image in the remote environment comprises an image of a customer service representative in the remote environment;
comparing the image in the remote environment to a stored image associated with the agent device comprises comparing the image of the customer service representative to the stored image; and
detecting the unauthorized change in the remote environment comprises detecting an unauthorized third party in the remote environment.

17. The non-transitory computer readable storage medium storing instructions of claim 15, wherein detecting the unauthorized change in the remote environment comprises detecting, based upon the comparison of the image in the remote environment to the stored image, that a change in the remote environment exceeds a predetermined threshold.

18. A non-transitory computer readable storage medium storing instructions that are executable to cause a system to perform operations comprising:
monitoring a remote environment associated with an agent device;
identifying an image in the remote environment;
detecting an unauthorized change in the remote environment, wherein detecting an unauthorized change in the remote environment comprises detecting an unauthorized mobile device comprising a cell phone in the remote environment, and
in response to detecting the unauthorized change in the remote environment, issuing a notification.

19. The non-transitory computer readable storage medium storing instructions of claim 15, wherein detecting an unauthorized change in the remote environment comprises:
determining a change value between the detected image in the remote environment and the stored image; and
determining whether the change value exceeds a threshold change value.

20. The non-transitory computer readable storage medium storing instructions of claim 18, wherein the instructions are executable to cause a system to perform operations further comprising responding to the notification, wherein responding to the notification comprises at least one of:
establishing a communication connection between a supervisor device and the agent device; and
disabling the agent device.

21. The non-transitory computer readable storage medium storing instructions of claim 18, wherein the instructions are executable to cause a system to perform operations further comprising:
in response to issuing the notification, identifying potentially misappropriated data, wherein identifying potentially misappropriated data comprises identifying data accessed by the agent device via a remote access at a time that the image in the remote environment was identified as potentially misappropriated data.

22. The non-transitory computer readable storage medium storing instructions of claim 18, wherein the remote agent device comprises a desktop and wherein the instructions are executable to cause a system to perform operations further comprising replicating the desktop upon detecting the unauthorized change in the remote environment.

23. The method of claim 4, wherein detecting the unauthorized change in the remote environment comprises detecting an agent raising the cell phone in the remote environment.

* * * * *